US008817697B2

(12) United States Patent
Savarkar et al.

(10) Patent No.: US 8,817,697 B2
(45) Date of Patent: Aug. 26, 2014

(54) SYSTEM AND METHOD FOR MINIMIZING CALL SETUP LATENCY IN A GROUP COMMUNICATION AMONG WIRELESS COMMUNICATION DEVICES

(75) Inventors: Gautam Savarkar, San Diego, CA (US); Devang Bhatt, San Diego, CA (US); Karthik Balu, San Diego, CA (US); Rajan Verma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1081 days.

(21) Appl. No.: 12/133,681

(22) Filed: Jun. 5, 2008

(65) Prior Publication Data

US 2009/0303878 A1 Dec. 10, 2009

(51) Int. Cl.
*H04W 4/00* (2009.01)
*H04W 72/00* (2009.01)
*H04W 76/00* (2009.01)
*H04W 28/26* (2009.01)
*H04W 4/10* (2009.01)

(52) U.S. Cl.
CPC .......... *H04W 72/005* (2013.01); *H04W 76/005* (2013.01); *H04W 28/26* (2013.01); *H04W 4/10* (2013.01)
USPC ........... 370/328; 370/235; 370/338; 370/261; 455/518; 455/405; 455/509; 455/450

(58) Field of Classification Search
USPC ......... 370/235, 261, 347, 337, 348, 342, 338; 455/518, 509, 517, 442, 519, 452, 405
See application file for complete search history.

(56) References Cited

U.S. PATENT DOCUMENTS

| 5,535,426 | A | | 7/1996 | Leigh et al. |
| 5,689,810 | A | * | 11/1997 | Shaughnessy et al. ....... 455/517 |
| 7,062,548 | B1 | * | 6/2006 | Peres ............................ 709/223 |
| 7,561,537 | B2 | * | 7/2009 | Schrader et al. .............. 370/261 |

(Continued)

FOREIGN PATENT DOCUMENTS

| CN | 1863374 A | 11/2006 |
| CN | 101005652 A | 7/2007 |

(Continued)

OTHER PUBLICATIONS

International Search Report, PCT/US2009/043635, International Searching Authority, European Patent Office, Oct. 6, 2009.

(Continued)

*Primary Examiner* — Rasheed Gidado
(74) *Attorney, Agent, or Firm* — Michael F. Taveira

(57) ABSTRACT

A system and method for minimizing call setup latency in a group communication among wireless communication devices by ensuring the requisite amount of communication bandwidth for group member devices that utilize separate communication systems to control communication channels established with each of the wireless communication devices. A group communication server that sets up group communications for wireless communication device members of a communication group communicates with a resource manager resident on a communication system to reserve a predetermined amount of resources, such as bandwidth, for wireless communication devices utilizing that communication system that are members of a communication group. The resource manager communicates the availability to the group communication server of the wireless communication devices utilizing that communication system for group communications only if the predetermined resources are available for a group communication to the wireless communication device.

43 Claims, 6 Drawing Sheets

(56) References Cited

U.S. PATENT DOCUMENTS

| | | | |
|---|---|---|---|
| 7,565,434 B1* | 7/2009 | Chaturvedi et al. | 709/227 |
| 7,694,002 B2* | 4/2010 | Vadlakonda et al. | 709/228 |
| 7,936,716 B2* | 5/2011 | Jang et al. | 370/329 |
| 8,045,557 B1* | 10/2011 | Sun et al. | 370/390 |
| 2003/0148785 A1* | 8/2003 | Mangal et al. | 455/552 |
| 2004/0181584 A1* | 9/2004 | Rosen et al. | 709/206 |
| 2005/0027581 A1* | 2/2005 | Kjesbu et al. | 705/8 |
| 2005/0195745 A1* | 9/2005 | Scott et al. | 370/241 |
| 2005/0259610 A1* | 11/2005 | Demers et al. | 370/328 |
| 2005/0287982 A1* | 12/2005 | Brewer et al. | 455/405 |
| 2005/0288049 A1* | 12/2005 | Gill et al. | 455/518 |
| 2006/0052126 A1 | 3/2006 | Choksi | |
| 2006/0063550 A1* | 3/2006 | Martin et al. | 455/518 |
| 2006/0084457 A1* | 4/2006 | Laha et al. | 455/519 |
| 2007/0226775 A1* | 9/2007 | Andreasen et al. | 726/1 |
| 2009/0275343 A1* | 11/2009 | Monnes et al. | 455/453 |

FOREIGN PATENT DOCUMENTS

| | | |
|---|---|---|
| EP | 1643780 A1 | 4/2006 |
| JP | 10023525 A | 1/1998 |
| RU | 2005131843 A | 3/2006 |
| WO | WO2004084455 A2 | 9/2004 |
| WO | WO2006002214 A1 | 1/2006 |
| WO | WO2007127092 A2 | 11/2007 |
| WO | 2009148775 A1 | 12/2009 |

OTHER PUBLICATIONS

Written Opinion, PCT/US2009/043635, International Searching Authority, European Patent Office, Oct. 6, 2009.

Path Switching and Routing, EventHelix.com, 2014, 2 Pages. Retrieved from the URL:<http://www.eventhelix.com/ThoughtProjects/Xenon/PathSwitchingAndRouting.htm#.U3OQB_IdXD4>.

Xenon Message Interactions, Xenon switch V5.2 Line to Line Call, Event Studio 1.0.2, 2000, 49 Pages, Event Helix.com.

Xenon Message Sequence, Xenon switch V5.2 Line to Line Call, Event Studio 1.0.2, 2000, 63 pages, Event Helix.com.

Xenon Switching System, A Digital Switching System Supporting ISUP and V5.2 Protocols, 2014, 3 Pages, EventHelix.com. Retrieved from the URL:<http://www.eventhelix.com/ThoughtProjects/Xenon>.

* cited by examiner

SYSTEM AND METHOD FOR MINIMIZING CALL SETUP LATENCY IN A GROUP COMMUNICATION AMONG WIRELESS COMMUNICATION DEVICES

BACKGROUND OF THE INVENTION

1. Field of the Invention

The present invention relates to point-to-point or point-to-multipoint wireless communications systems. More specifically, the present invention relates to a system and method for minimizing call setup latency by ensuring adequate communication bandwidth for a group communications between wireless devices that are members of a communication group, such as push-to-talk (PTT) communication group.

2. Description of the Related Art

There exists a wireless telecommunication service that provides a quick one-to-one or one-to-many communication between groups of wireless communication devices, such as mobile telephones, that is generically referred to as "Push-To-Talk" (PTT) capability. The specific PTT group of recipient devices for the communicating wireless device is commonly set up by the carrier. A PTT communication connection is typically initiated by a single button-push on the wireless device that activates a half-duplex link between the speaker and each member device of the group and once the button is released, the device can receive incoming PTT transmissions. In some arrangements, the PTT speaker will have the "floor" where no other group member can speak while the speaker is speaking. Once the speaker releases the PTT button, any other individual member of the group can engage their PTT button and they will have the floor.

Because PTT communications involve voice, it is imperative that their transmissions get the required quality of service ("QoS"). One critical component to ensure QoS is to guarantee the network bandwidth/resources required by the PTT application are available for the voice communications. This reservation of the bandwidth and resources is difficult to implement in a dynamic fashion in a PTT system because the various group members can be distributed across heterogeneous distributed systems consisting of both fixed and variable bandwidth networks. In particular, for voice-over-internet protocol ("VoIP") applications that consist of multiple simultaneous sessions traversing multiple systems, the problem becomes especially difficult given that each session may have different bandwidth/resource requirements.

Consequently, for PTT sessions and VoIP sessions, each session established needs to be guaranteed fixed resources in all the systems that are serving the session, and each system needs to guarantee that the maximum resources available to it are not exceeded when there are several sessions being established simultaneously. Furthermore, in the PTT call setup, the session establishment times need to be kept low.

There have been several attempts to address this problem in resources allocation for communications. One attempt utilizes centralized resource allocation where a centralized allocator keeps track of all the available resources, end-to-end for all communications. In this system, all entities that will need resources send messages to the centralized allocator requesting resources and the allocator responds with the allocated resources before setting up each session. However, the use of a centralized allocator does not scale well, and as the system expands, the centralized allocator gets heavily loaded and becomes a bottleneck for setting up communications.

Another method to address the resource allocation necessary to maintain communication quality of server is to use an "end-to-end" resource allocation system where the first portion of session establishment involves traversing through each node in the network and reserving resources in each of these nodes. While this system guarantees reserved resources throughout each system, the express step of reserving resources tremendously increases the per session communications establishment/teardown times. This type of system is often referred to as a "virtual circuit" or "socket" established in a network.

Accordingly, it would be advantageous to provide a system and method that would assist in the provision of minimum resources allocation in a PTT or VoIP communication session that does not impede call setup or teardown. Such system and method should be able to establish a reliability of resource allocation over a variety of communication systems, and be easily scalable. It is thus to the provision of such a system and method for minimizing call setup latency for a group communication between wireless communication devices that the present invention is primarily directed.

SUMMARY OF THE INVENTION

The present invention includes a system and method for minimizing call setup latency in a group communication among wireless communication devices by ensuring the requisite amount of communication bandwidth or resources for communication group member devices that utilize separate communication systems to control communication channels established with each of the wireless communication devices. A group communication server that sets up group communications for wireless communication device members of a communication group communicates with a resource manager that is resident on a communication system that controls communications for group member wireless devices to reserve a predetermined amount of resources, such as bandwidth, for each group member to ensure that the resources required for the group communications are properly allocated. The resource manager communicates the availability to the group communication server of the wireless communication devices utilizing that communication system for group communications only if the predetermined resources are available for a group communication to the member wireless communication device.

In one embodiment, the system for minimizing call setup latency in a group communication among wireless communication devices includes a plurality of communication systems for wireless communication devices wherein each communication system is configured to control communication channels established with each of the wireless communication devices that utilize that communication system for, at least, wireless communications, such as mobile telephone of a PTT group. For PTT communications, at least one group communication server will set up group communications for wireless communication device members of a communication group that the group communication server handles. The communication system includes a resident resource manager that selectively reserves a predetermined amount of resources, such as bandwidth, for the wireless communication devices utilizing that communication system and that are members of a communication group for the group communication server. The resource manager communicates the availability to the group communication server of one or more of the wireless communication devices utilizing that communication system for group communications only if the predetermined resources are available for a group communication to a wireless communication device utilizing the communication system.

In one embodiment, the method for minimizing call setup latency for group communications among wireless communication devices, such as mobile telephones and other communication devices that can communicate voice, includes the steps of placing a resource manager on at least one computer device, such as a control system for a group communication server, within a communication system that is configured to control communication channels established with each of the wireless communication devices utilizing that communication system for at least wireless communications, wherein the resource manager will selectively reserve a predetermined amount of resources for wireless communication devices utilizing that communication system and which are members of a communication group. Then the method includes the step of requesting, from at least one group communication server that sets up group communications for wireless communication device members of a communication group, that the resource manager reserve predetermined resources for a group communication to one or more wireless communication devices that utilize that communication system, and then the resource manager reserving the requested predetermined resources, such as a preset amount of bandwidth.

The present system and method are therefore advantageous in that they allow a group communication system, such as a PTT system, to ensure a minimum amount of resource allocation across a variety of communication systems for a PTT or VoIP communication session, and are therefore easily scalable over a variety of computer architectures. The system and method utilize a resource manager placed in the various communication systems that handles the resource allocation such that the communication-controlling server, such as a group communication server, does not have to expend resources every time a communication session is desired to ensure end-to-end QoS. The use of the resource manager therefore minimally interferes with call setup or teardown, as opposed to other known methods to ensure end-to end QoS.

Other objects, features, and advantages of the present invention will become apparent after review of the Brief Description of the Drawings, Detailed Description, and the Claims.

DETAILED DESCRIPTION

In this description, the terms "communication device," "wireless device," "wireless communications device," "PTT communication device," "handheld device," "mobile device," and "handset" are used interchangeably. The terms "call" and "communication" are also used interchangeably. The term "application" as used herein is intended to encompass executable and non-executable software files, raw data, aggregated data, patches, and other code segments. The term "exemplary" means that the disclosed element or embodiment is only an example, and does not indicate any preference of user. Further, like numerals refer to like elements throughout the several views, and the articles "a" and "the" includes plural references, unless otherwise specified in the description.

Furthermore, the present invention is shown here in several embodiments as operating in a CDMA2000 network architecture. Reference can be had to the known standards and construction of CDMA2000 systems and network interfaces as would be known to one of skill in the art. Other telecommunication standards, such as CDMA2000 Evolution Data-Optimized (EvDO) or IMT-2000, can likewise be used in implementation of the present system 10.

Figure 1:
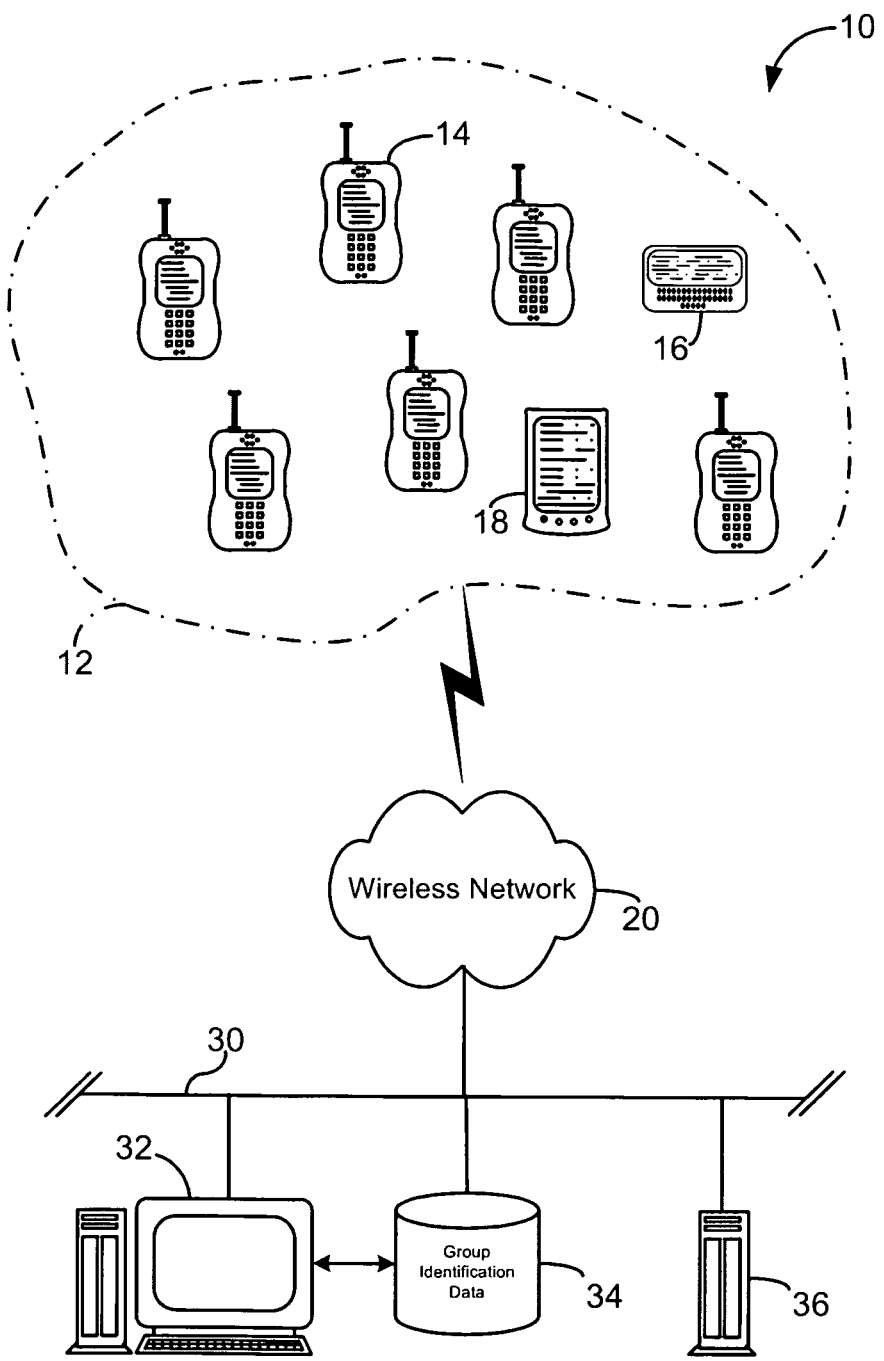
FIG. 1 is a representative diagram of one embodiment of a wireless network with a designated PTT group of wireless telecommunication devices communicating with a group communication server and other computer devices across the wireless network

With reference to the figures in which like numerals represent like elements throughout, FIG. 1 illustrates one embodiment of a system 10 with a group communication server 32 and one or more wireless telecommunication devices in a communication group 12, such as wireless telephone 14, smart pager 16, and personal digital assistant (PDA) 18, that communicate with other wireless telecommunication devices across a wireless network 20. In the system 10, each wireless telecommunication device 14, 16, 18 is capable of selectively directly communicating across the wireless communication network 20 with a target set of one or more other wireless telecommunication devices of the plurality. For example, the target set for mobile telephone 14 can be all devices in the communication group 12 or a subset thereof, such as pager 16 and PDA 18.

In this embodiment, the wireless telecommunication device (such as mobile telephone 14) notifies the group communication computer device, shown here as group communication server 32, which is present on a server-side LAN 30 across the wireless network 20, to indicate that the wireless device is present, i.e. accessible, on the wireless network 20. The group communication computer device 32 can share this information with the set of target wireless telecommunication devices designated by the first wireless telecommunication device, or can also share the information with other computer devices resident on the server-side LAN 30 or accessible across the wireless network 20. The group communication computer device 32 can have an attached or accessible database 34 to store the group identification data for the wireless devices.

As is more fully described herein, also shown on the server-side LAN 30 is a Regional MCU Manager (RMM) 36 that is configured as the central focal point for managing all the media resources for its local region. Before media resources are assigned to a group communication, such as a PTT call, the RMM 36 checks if the required bandwidth is available to each call leg of the call, and reserves the required bandwidth. If the required bandwidth is not available for the group communication, the RMM sends a failure to the Regional Dispatcher, which in turn, fails the group communication by sending a STATUS failure to the sending wireless device 14,16,18. It should be appreciated that the number of computer components resident on server-side LAN 30, or across the wireless network 20, or Internet generally, are not limited.

The direct communication, such as a PTT communication, can be established through a half-duplex channel between the communicating wireless telecommunication device 14, 16, 18 and the one or more other wireless telecommunication devices of the target set of devices. Also, the group communication computer device 32 can attempt to bridge the requested direct communication with the target set if at least one of the wireless telecommunication devices of the target set have informed the group communication computer device 32 of their presence on the wireless network 20.

The group communication computer device 32 can also inform the wireless telecommunication device 14, 16, 18 of the inability to bridge a direct communication to the target set 12 upon none of the wireless telecommunication devices (or at least one) of the target set not having informed the group communication computer device 32 of their presence on the wireless network 20. Further, while the group communication computer device 32 is shown here as having the attached database 34 of group identification data, the group communication computer device 32 can have group identity data resident thereupon, and perform all storage functions described herein.

The group communication can be voice, applications, graphic media, such as pictures in JPEG, TIF, and the like, or audio files such as MP3, MP4, WAV, and the like. The media can also be video or streaming media, such as a multimedia application (PowerPoint, MOV file, and the like). Also, the group communication is typically half-duplex audio conferencing among members of the communication group 12. However, in the group communications, the speed of the connection and the quality of media delivery, and especially voice data, are important to maintain QoS to the end-user.

Figure 2:
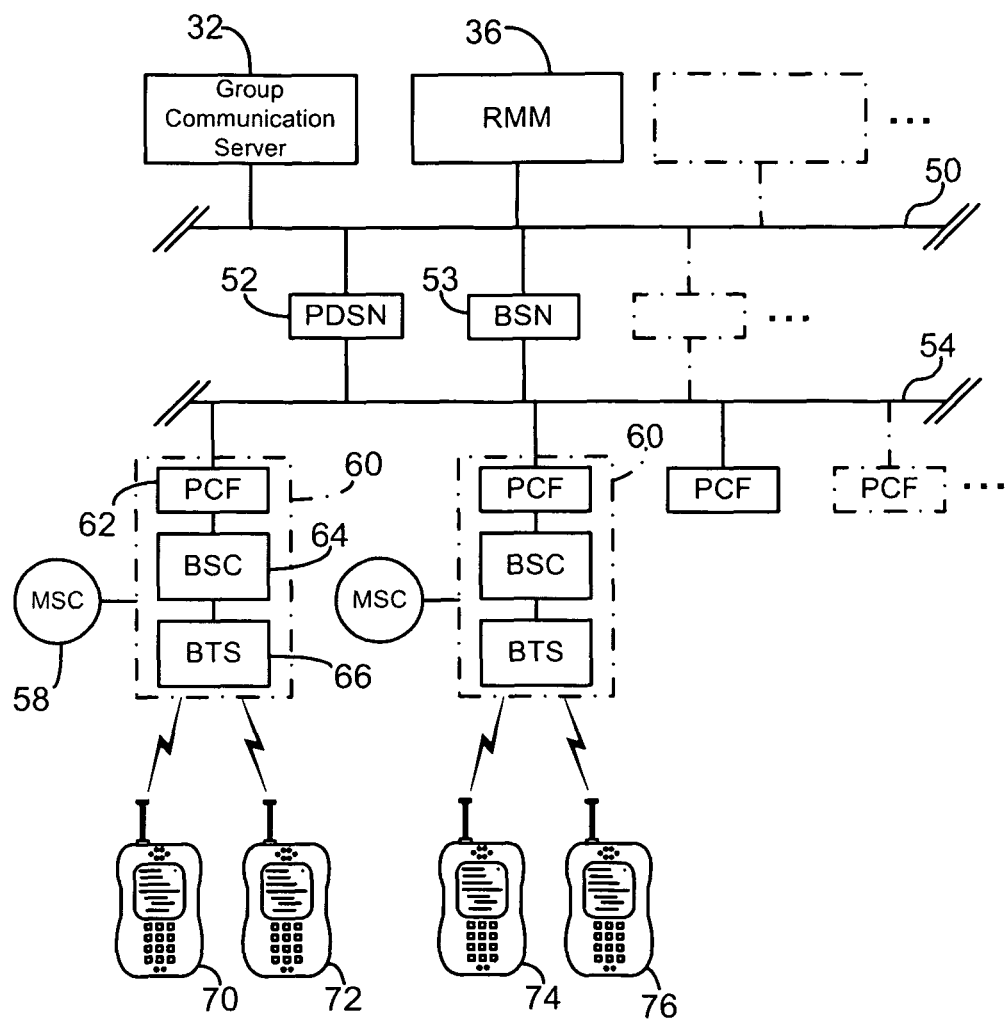
FIG. 2 is a representative diagram of one embodiment of a wireless network in a common cellular telecommunication configuration, having a group communication server control communications between the wireless telecommunication devices of PTT group members and a regional MCU manager (RMM) resident on the server-side with the group communications server.

FIG. 2 is a representative diagram of one embodiment of a wireless network in a common cellular telecommunication configuration, having a series of group communication computer devices, such as group communication server 32 that controls communications between the wireless communication devices of set group members (devices 70, 72, 74, 76) in a PTT system. The wireless network is merely exemplary and can include any system whereby remote modules communicate over-the-air between and among each other and/or between and among components of a wireless network 20, including, without limitation, wireless network carriers and/or servers. A series of group communication servers 32 are connected to a group communication server LAN 50. Wireless telephones can request packet data sessions from the group communication server(s) 32 using a data service option. Also shown on LAN 50 is RMM 36.

The group communication server 32 is connected to a wireless service provider's packet data service node (PDSN) such as PDSN 52, and/or a broadcast serving node (BSN) 53 shown here resident as on a carrier network 54. The PDSN 52 and BSN 53 with the associated base stations 60 can constitute a regional communication system, or the further inclusion of other server side 50 components, that will control communications to the wireless communication devices 70,72,74,76 for a geographical or virtual region. Each PSDN 52 or BSN 53 can interface with a base station controller 64 of a base station 60 through a packet control function (PCF) 62. The PCF 62 is typically located in the base station 60. The carrier network 54 controls messages (generally in the form of data packets) sent to a messaging service controller ("MSC") 58. The carrier network 54 communicates with the MSC 32 by a network, the Internet and/or POTS ("plain ordinary telephone system"). Typically, the network or Internet connection between the carrier network 54 and the MSC 58 transfers data, and the POTS transfers voice information. The MSC 58 can be connected to one or more base stations 60. In a similar manner to the carrier network, the MSC 58 is typically connected to the base transceiver station (sometimes referred to as "branch-to-source") (BTS) 66 by both the network and/or Internet for data transfer and POTS for voice information. The BTS 66 ultimately broadcasts and receives messages wirelessly to and from the wireless devices, such as cellular telephones 70,72,74,76, by short messaging service ("SMS"), or other over-the-air methods known in the art. It should also be noted that carrier boundaries and/or PTT operator network boundaries do not inhibit or prohibit the sharing of data as described herein.

Cellular telephones and mobile telecommunication devices, such as wireless telephone 14, are being manufactured with increased computing capabilities and are becoming tantamount to personal computers and hand-held PDAs. These "smart" cellular telephones allow software developers to create software applications that are downloadable and executable on the processor of the wireless device. The wireless device, such as cellular telephone 14, can download many types of applications, such as web pages, applets, MIDlets, games and data. In wireless devices that have designated a communication group 12 (FIG. 1), the wireless communication device can directly connect with the other member of the set and engage in voice and data communication. However, all such group-direct communications may occur through, or be at the control of, the group communication server 32. All data packets of the devices do not necessarily have to travel through the group communication computer device 32 itself, but the group communication computer device 32 may be able to ultimately control the communication because it will typically be the only server-side 30 component that is aware of and/or can retrieve the identity of the members of the communication group, or direct the identity of the members of the communication group 12 to another computer device.

In overview, the system 10 for minimizing call setup latency in a group communication among wireless communication devices 14,16,18 includes a plurality of communication systems for wireless communication devices 14,16,18 wherein each communication system (such as the cellular telephone configuration in FIG. 2) configured to control communication channels or pathways for each of the wireless communication devices utilizing that communication system for, at least, wireless communications, such as voice. At least one group communication server 32 that sets up group communications for wireless communication device members of a communication group 12, such as members 14,16,18. A resource manager (such as resource managers 106,112 in FIG. 4) is resident on at least one of the plurality of communication systems (such as RMM 36)wherein the resource manager selectively reserves a predetermined amount of resources, such as communications bandwidth, for wireless communication devices 14,16,18 utilizing that communication system that are members of a communication group 12. In one embodiment, the resource manager communicates the availability to the group communication server 32 of one or more of the wireless communication devices 14,16,18 utilizing that communication system for group communications only if the predetermined resources are available for a group communication to a wireless communication device utilizing the communication system.

Figure 6:
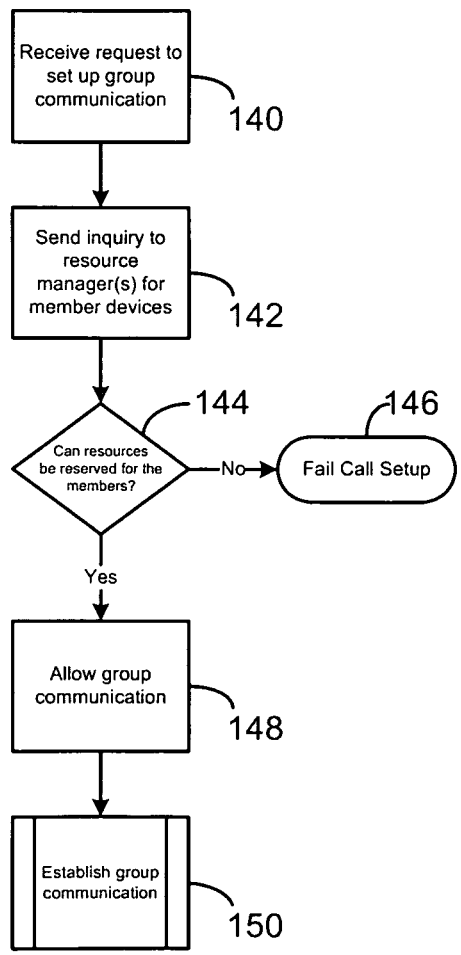
FIG. 6 is a flowchart of one embodiment of a process on the group communication server to setup a group communication and contact the appropriate resource managers to reserve the requisite resources for the communication.

In one embodiment, as is more particularly shown in FIG. 6, the group communication server 32 notifies the resource manager of a wireless communication device 14,16,18 group member utilizing the communication system where the resource manager is resident and, upon the notification, either reserves the resources for that wireless communication device 14,16,18 or indicates the failure to reserve the resources to the group communication server 32. Each of a plurality of communication systems can include a resource manager, such as several different intra-carrier or inter-carrier telecommunications systems.

Figure 3:
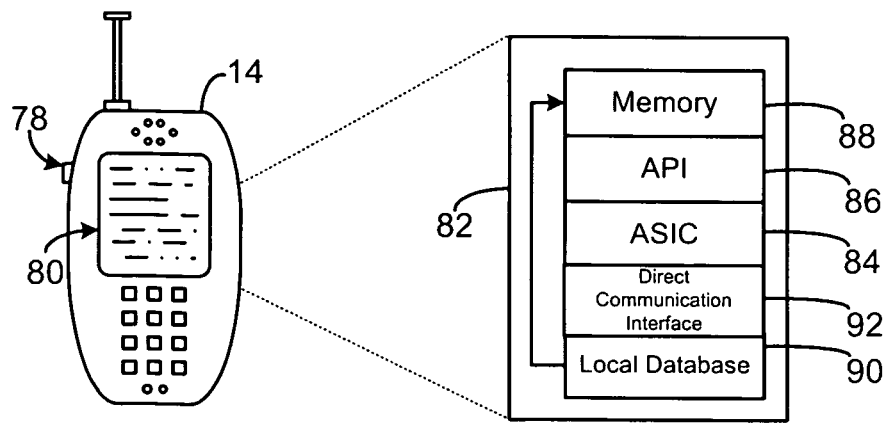
FIG. 3 is a block diagram illustrating the computer platform of the wireless telecommunication device embodied with PTT capability.

FIG. 3 is a block diagram illustrating one embodiment of the wireless telecommunication device being a mobile telephone 14 with a PTT button 78 that opens the direct communication to a target set of devices, i.e. other members of the communication group 12. The wireless device 14 is also shown as having a graphics display 80 to the user of the wireless device 14. The wireless device 14 includes a computer platform 82 that can handle voice and data packets, and receive and execute software applications transmitted across the wireless network 20 to include the group communications. The computer platform 82 includes, among other components, an application-specific integrated circuit ("ASIC") 84, or other processor, microprocessor, logic circuit, programmable gate array, or other data processing device. The ASIC 84 is installed at the time of manufacture of the wireless device and may not normally be upgradeable. The ASIC 84 or other processor executes an application programming interface ("API") layer 86, which includes the resident application environment, and can include the operating system loaded on the ASIC 84. The resident application environment interfaces with any resident programs in the memory 88 of the wireless device. An example of a resident application environment is the "binary runtime environment for wireless" (BREW) software developed by QUALCOMM® for wireless device platforms.

As shown here, the wireless device can be a mobile telephone 14, with a graphics display 80, but can also be any wireless device with a computer platform 82 as known in the art, such as a personal digital assistant (PDA), a pager with a graphics display 26, or even a separate computer platform that has a wireless communication portal, and may otherwise have a wired connection to a network or the Internet. Further, the memory 88 can be comprised of read-only or random-access memory (RAM and ROM), EPROM, EEPROM, flash cards, or any memory common to computer platforms. The computer platform 82 can also include a local database 90 for storage of software applications not actively used in memory 88. The local database 90 is typically comprised of one or more flash memory cells, but can be any secondary or tertiary storage device as known in the art, such as magnetic media, EPROM, EEPROM, optical media, tape, or soft or hard disk.

In this embodiment of the wireless communication device, the computer platform 82 also includes a direct communication interface 92 that can open the direct communication channel from the wireless device, typically for the half-duplex voice communication in a PTT call. The direct communication interface 92 may also be part of the standard communication interface for the wireless device which ordinarily carries the voice and data transmitted to and from the wireless device. The direct communication interface 92 typically is comprised of hardware as is known in the art.

Figure 4:
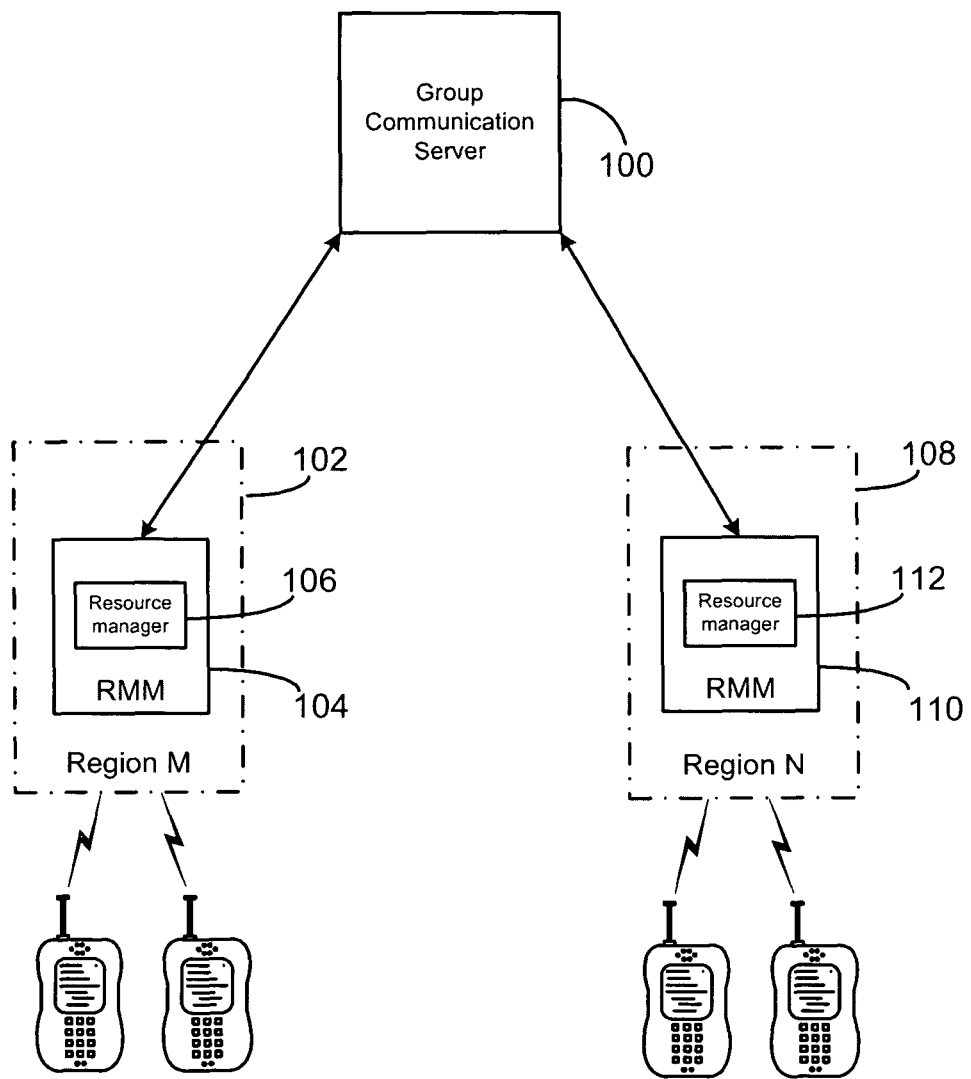
FIG. 4 is a block diagram illustrating an exemplary, non-limiting embodiment of a system that utilizes resource managers resident on the regional communication systems, and a group communication server communicates with the RMMs to reserve the appropriate resources for group communications.

FIG. 4 is a block diagram illustrating an exemplary, non-limiting embodiment of a system that utilizes resource managers 106,112 resident on the regional communication systems 102,108, and a group communication server 100 communicates with the RMMs 104,110 to reserve the appropriate resources for group communications. Here, communication system 102 is for Region M and communication system 108 is for Region N.

In one embodiment where the present system 10 is used in a PTT call, the call consists of two or more call "legs", where each call leg is a user participating in the call. Each call leg requires a fixed bandwidth (bit rate), and before the group call can be established (i.e., voice traffic can flow), the group communication server 32 checks if the requested bandwidth is available for all the call legs of the PTT call, including for call legs that may lie outside the region for that specific group communication server 32. The local group communication server 32 can confirm available bandwidth internally for call legs terminating within the local region (incoming or outgoing), but for call legs terminating outside the local region (incoming or outgoing), the local group communication server 32 confirms available bandwidth for those call legs by contacting the other group communication network elements in those regions, such as those regions' group communication servers or the RMM 36. The group communication server 32 will only include call legs (both intra-regional and inter-regional) with confirmed bandwidth in a PTT call. Call legs that do not have the required bandwidth are excluded from the call. When the PTT call terminates, the bandwidth used for each of the call legs of the call becomes available for other PTT calls.

Thus, in this embodiment, the RMM 36 is configured with these configuration parameters to respond to inquiring group communication servers 32 attempting to set up the inter-regional group communications. Here, the RMM 36 manages all the media resources for its local region, and before media resources are assigned to a PTT call, the RMM 36 checks, at the resource manager 106,112 if the required bandwidth is available to each call leg of the call, and reserves the required bandwidth for the call in that region. If the required bandwidth is not available for the PTT call, the RMM 36 sends a failure to the group communication server 32, and potentially the end user attempting to start a PTT call.

Accordingly, the system 10 addresses the scaling and call setup latency problem by distributing the resource management function to each one of the distributed communication systems. In one embodiment, the resource manager 106,112 (here embodied as resident on RMM 36) monitors the resources utilized by each session hosted in its own system, the resources utilized by each session that is outside of its own communication system that involve clients in its system, the pool of total available resources in its communication system, and any other Session Context (for each session, which other systems are involved in the resource reservation). Consequently, every session establishment, modification and teardown request is directed through the resource manager 106, 112 in the communication system. On receiving a session establishment request, the resource manager 106,112 reserves resources in its system for the session. The resource manager 106,112 reserves resources in other communication systems involved in the session (found by inspecting the request) by sending a resource reservation request to their resource managers 106,112. On successfully reserving requests in its communication system and other systems involved in the session, the resource manager 106,112 allows the session establishment request to go through. Otherwise, the resource manager 106,112 makes the decision to fail the session establishment request.

On receiving a session modification request, the resource manager 106,112 reserves/frees resources in its communication system for the session based on the modification request, and reserves/frees resources in other communication systems involved in the session (found by inspecting the request) by sending a resource reservation requests to their resource managers 106,112. On successfully reserving/freeing requests in its communication system and other communication systems involved in the session, the resource manager 106,112 allows the session modification request to go through. Otherwise, the resource manager makes the decision to fail the session modification request.

On receiving a session teardown request, the resource manager 106,112 frees resources in its communication system for the session, and frees resources in other communication systems involved in the session (found in the Session Context) by sending a free resource request to their resource managers 106,112. On successfully freeing requests in its communication system and other systems involved in the session, the resource manager 106,112 allows the session teardown request to go through.

On receiving a reserve resource request from another system, the resource manager 106,112 reserves resources for the session in its communication system and if successful, responds as such to the requesting communication system/group communication server 32. If the required resources are not available, the resource manager 106,112 responds with failure. On receiving a free resource request from another system, the resource manager 106,112 frees the resources for the session in its communication system. In one embodiment, each resource manager 106,112 maintains a "heartbeat" for each session with involved resource managers 106,112 in other systems to verify the validity of sessions in case of system failures. Each resource manager can itself be a distributed/replicated system for availability reasons, and they stay in sync with each other using the two-phase commit protocol. The resource managers 106,112 in a communication system are configured to releam the resource information in the system by periodic querying of other resource managers 106,112 in the system. Such periodic verification of resources can also occur from the group communication server 32 periodically verifying the resource availability at the resource manager 106,112.

In one embodiment, the requesting wireless communication device 14,16,18 for the PTT communication is modified to support the receiving of a failure message upon the failure of a resource manager to reserve the appropriate resources. The wireless communication device 14,16,18 may then optionally display an error message to the user to indicate that the call failed due to lack of resources.

The use of the distributed resource managers 106,112 accordingly allows a very fast response to resource reservation requests without having to do a node-by-node ("end-to-end") reservation in the system. There is also no need to maintain a centralized resource manager for all the involved systems as each communication system manages its own resource utilization. The present system 10 thus has the resource utilization step being a small fraction of the total cost of session establishment, which implies lower latency in call setup. Thus, the present system 10 can be used to reserve network resources for each call in a VoIP system in a manner similar to the PTT system.

Figure 5:
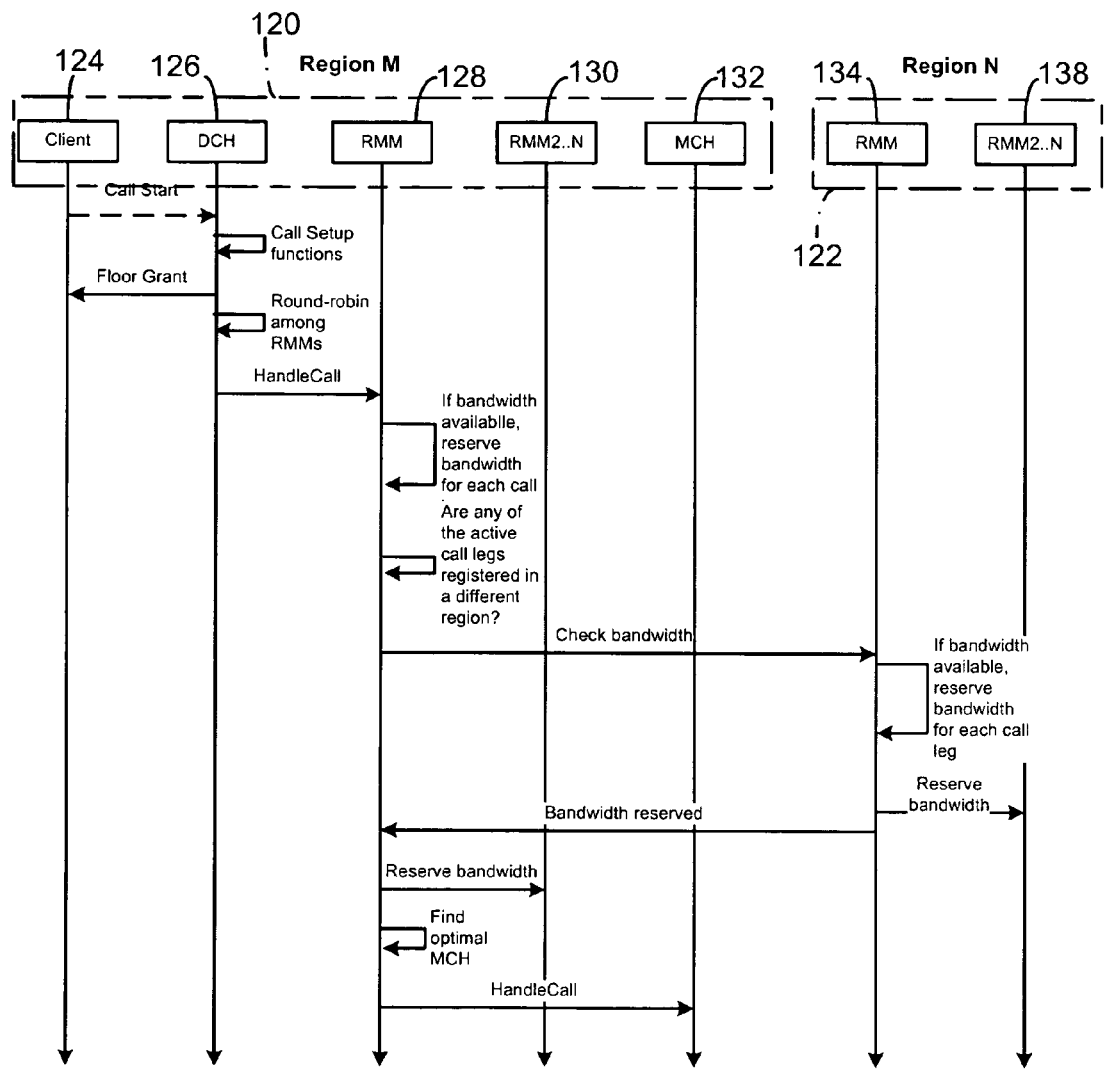
FIG. 5 is a diagram of the process flow for a reservation of resources between the communication systems between two different regions.

FIG. 5 is a diagram of one embodiment of the process flow for a reservation of resources between the communication system 120 of Region M, and communication system 122 for Region N. An end-user client 124 requests a call to the dispatch handler 126 which then grants the floor to the client 124 and sends the call to the resident RMM 128, that then polls the other RMMs 130 in its own regions, and determines if other regions are needed for call legs, such as Region N. The RMM 128 of Region M contacts the RMM 134 of the communication system 122 of Region N to verify bandwidth availability. The RMM 134 then checks the other local RMMs 138 of the communication system 122 to verify bandwidth availability, and if so, reserves the bandwidth, and notified the RMM 128 of the communication system 120 of the reserved bandwidth in Region N. Then RMM 128 reserves the local bandwidth of the communication system 120 and forwards the call handling to the media control handler (MCH) 132 to complete the PTT call setup.

FIG. 6 is a flowchart of one embodiment of a process on the group communication server 32 to setup a group communication and contact the appropriate resource managers 106, 112 to reserve the requisite resources for the communication. The group communications server 32 receives a request to set up a group communication, a shown at step 140, and then sends an inquiry to the resource manager(s) for the member wireless communication devices that are intended to receive the call, as shown at step 142, which is contacting RMM 128 in FIG. 5. Then, a determination is made as to whether the resources can be reserves for the members, as shown at decision 144. If the resources cannot be reserved at decision 144, then the call setup is failed, as shown at termination 146, and the appropriate notification is given to the end-user and/or other system components. Otherwise, if the resources can be reserved at decision 144, then the group communication is allowed, as shown at step 148, and the group communication is then established, as shown at predefined process 150.

Figure 7:
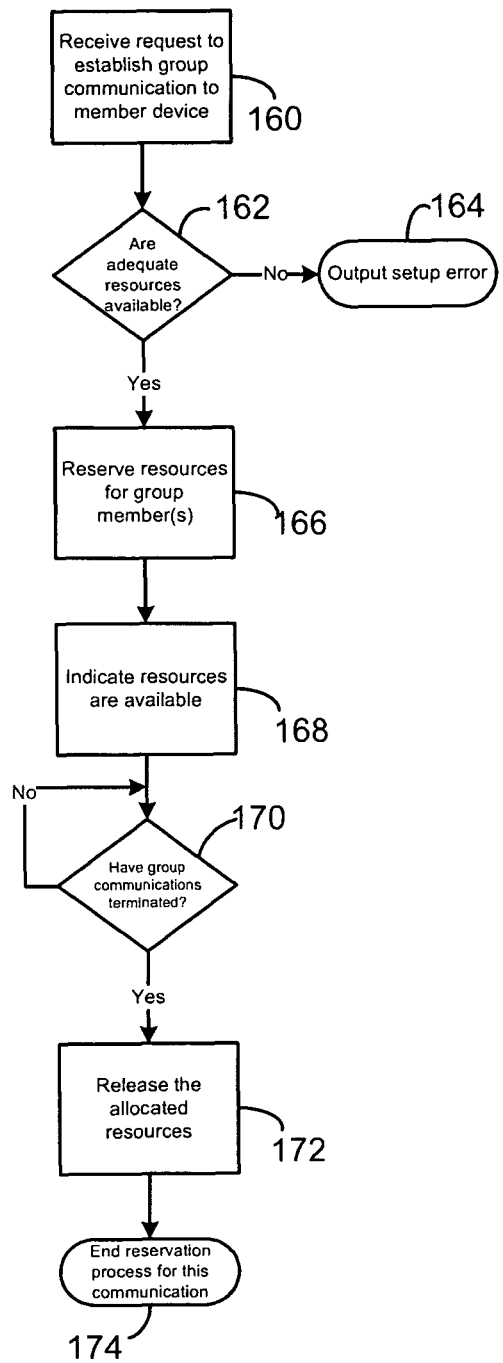
FIG. 7 is a flowchart of one embodiment of a process on the RMM wherein the resource manager allocates the appropriate resources for group communications to one or more wireless communication devices based upon a request received from a group communication server.

FIG. 7 is a flowchart of one embodiment of a process on the RMM 104,110 (in FIG. 4) wherein the resource manager 106,112 allocates the appropriate resources for group communications to one or more wireless communication devices 14,16,18 based upon a request received from a group communication server 100. A request to establish a group communication to a member device that is on the communication system of the RMM 104,110, as shown at step 160. A determination is then made as to whether there are adequate resources available, as shown by decision 162, such process also being shown in the embodiment of FIG. 5 and RMM 128. If the resources are not available at decision 162, then an error is output to the group communication server 100 and the process terminates, as shown at termination 164.

Otherwise, if the resources are available at decision 162, then the predetermined amount of resources are reserved as shown at step 166, and the resources are then indicated as available to the group communication server 100, as shown at step 168. A determination is then made as to whether the group communications have terminated as shown at decision 170. If the group communications have not terminated at decision 170, then the process enters a wait state at decision 170 until group communication does terminate. It should be noted that other modifications to resources and determinations on session modifications can be made during the ongoing communication. Once the communication has terminated at decision 170, the allocated resources are released, as shown at step 172, and then process terminates for that specific reservation request and allocation, as shown at termination 174.

It can thus be seen that the present system 10 provides a method and process for minimizing call setup latency for group communications among wireless communication devices 14,16,18 having the steps of placing a resource manager 106,112 on at least one computer device (such as RMM 104,110) within a communication system configured to control communication channels established with each of the wireless communication devices 14,16,18 utilizing that communication system for at least wireless communications, with the resource manager 106,112 selectively reserving a predetermined amount of resources, such as bandwidth, for the specific member wireless communication devices utilizing that communication system that are members of a communication group 12. Then, the method includes the step of requesting, from at least one group communication server 32 that sets up group communications for wireless communication device members of a communication group 12, the resource manager 106,112 reserving predetermined resources for a group communication to a wireless communication device utilizing the communication system, and then reserving the requested predetermined resources.

The request to the resource manager 106,112 to reserve predetermined resources can be requesting the reservation of bandwidth for a group communication to a utilizing wireless communication device 14,16,18 of the communication system. The method can also include, upon the group communication server 32 notifying the resource manager 106,112 of a wireless communication device 14,16,18 utilizing the communication system where the resource manager 106,112 is resident and resources are unavailable, indicating the failure, from the resource manager 106,112, to reserve the resources for the group communication server 32. The placing of a resource manager 106,112 can be placing a resource manager 106,112 on each of a plurality of communication systems. The method can also further include the steps of reserving resources by the resource manager 106,112 for a predetermined amount of bandwidth for each wireless communication device 14,16,18 that utilizes that communication system and is a member of a communication group 12. The group communication server 32 can also periodically verify the resource availability at the resource manager 106,112.

In view of the methods being executable on a mobile device and other computer platforms, the method can accordingly be performed by a program resident in a computer readable medium, where the program directs the mobile device or other computer device having a computer platform to perform the steps of the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed is:

1. A system for minimizing call setup latency in a group communication among wireless communication devices, comprising:
   a plurality of communication systems for wireless communication devices, wherein the plurality of communication systems are each configured to control communications channels established with each of the wireless communication devices utilizing that communication system to participate in a wireless group communication;
   at least one group communication server configured to set up the wireless group communication for each of the wireless communication devices that are members of a communication group before establishing the wireless group communication among the member wireless communication devices; and
   a resource manager resident on at least one communication system of the plurality of communication systems, wherein the resource manager is configured to reserve an amount of resources that are required by each of the member wireless communication devices utilizing the at least one communication system to participate in the wireless group communication, and to communicate to the at least one group communication server that each of the member wireless communication devices utilizing the at least one communication system are allowed to participate in the wireless group communication only if the amount of resources required for all of the member wireless communication devices utilizing the at least one communication system to participate in the wireless group communication have been successfully reserved within the at least one communication system,
   wherein the at least one group communication server is further configured to establish the wireless group communication with the member wireless communication devices utilizing the at least one communication system only if the resource manager confirms that the required amount of resources have been reserved to all member wireless communication devices utilizing the at least one communication system to participate in the wireless group communication.

2. The system of claim 1, wherein the required amount of resources comprises available bandwidth within the at least one communication system.

3. The system of claim 1, wherein the resource manager is further configured to receive, from the at least one group communication server, a notification of the member wireless communication devices utilizing the at least one communication system where the resource manager is resident and respond to the notification from the at least one group communication server with either an indication that the required amount of resources were successfully reserved if the required amount of resources were assigned to the wireless group communication within the at least one communication system or with failure if the required amount of resources are not available within the at least one communication system.

4. The system of claim 1, wherein the at least one communication system of the plurality of communication systems where the resource manager is resident comprises each of the plurality of communication systems.

5. The system of claim 2, wherein the resource manager is further configured to reserve a predetermined amount of the available bandwidth for all legs of the wireless group communication that terminate within the at least one communication system.

6. The system of claim 1, wherein the at least one group communication server is further configured to periodically query the resource manager to verify availability of the required amount of resources for the wireless group communication within the at least one communication system where the resource manager is resident.

7. The system of claim 2, wherein the wireless group communication includes a plurality of legs and wherein the at least one group communication server is further configured to include at least one of the plurality of legs in the wireless group communication if the available bandwidth meets bandwidth requirements associated therewith or exclude the at least one of the plurality of legs from the wireless group communication if the available bandwidth does not meet the bandwidth requirements associated therewith.

8. The system of claim 1, wherein the resource manager is further configured to receive a session modification request for the wireless group communication, attempt to reserve or free resources within the at least one communication system based on the session modification request, and indicate to the at least one group communication server that the session modification request succeeded or failed based on whether or not the resources associated with the session modification request were successfully reserved or freed.

9. The system of claim 1, wherein the resource manager is further configured to release the amount of resources that were reserved to the member wireless communication devices utilizing the at least one communication system in response to determining that the wireless group communication has terminated.

10. The system of claim 9, wherein the resource manager is further configured to determine that the wireless group communication has terminated in response to receiving a session teardown request.

11. The system of claim 1, wherein the at least one group communication server is further configured to notify the member wireless communication devices utilizing the at least one communication system that the set up associated with the wireless group communication failed if the resource manager indicates that the amount of resources that each member wireless communication device utilizing the at least one communication system requires to participate in the wireless group communication are unavailable within the at least one communication system.

12. The system of claim 1, wherein the at least one group communication server is further configured to set up the wireless group communication for each of the member wireless communication devices that have notified the at least one group communication server to indicate presence on a wireless network that includes the plurality of communication systems.

13. A method for minimizing call setup latency for group communications among wireless communication devices, comprising:

placing a resource manager on at least one computer device within a communication system configured to control communication channels established with each of the wireless communication devices utilizing that communication system to participate in a wireless group communication;

requesting, from at least one at least one group communication server that sets up the wireless group communication for each of the wireless communication devices that are members of a communication group before establishing the wireless group communication among the member wireless communication devices, that the resource manager reserve an amount of resources that are required by each of the member wireless communication devices utilizing the communication system to participate in the wireless group communication;

reserving, at the resource manager, the requested amount of resources required for each of the member wireless communication devices utilizing the communication system to participate in the wireless group communication if the required amount of resources are available;

communicating, from the resource manager to the at least one group communication server, that each of the member wireless communication devices utilizing the communication system are allowed to participate in the wireless group communication only if the amount of resources required for all of the member wireless communication devices utilizing the communication system to participate in the wireless group communication have been successfully reserved within the communication system; and establishing, by the at least one group communication server, the wireless group communication with the member wireless communication devices utilizing the communication system only if the resource manager confirms that the required amount of resources have been reserved to all member wireless communication devices that are utilizing the communication system to participate in the wireless group communication.

14. The method of claim 13, wherein the requested amount of resources comprises available bandwidth within the communication system.

15. The method of claim 13, further comprising receiving, at the resource manager, a notification of the member wireless communication devices utilizing the communication system where the resource manager is resident, wherein the resource manager indicates a failure to reserve the requested amount of resources to the at least one group communication server in response to the notification if the required amount of resources are not available within the communication system.

16. The method of claim 13, further comprising placing the resource manager on each of a plurality of communication systems.

17. The method of claim 14, further comprising reserving, at the resource manager, a predetermined amount of the available bandwidth for all legs of the wireless group communication that terminate within the communication system where the resource manager is resident.

18. The method of claim 13, further comprising the at least one group communication server periodically querying the resource manager to verify availability of the required amount of resources for the wireless group communication within the communication system where the resource manager is resident.

19. A resource manager resident on at least one communication system of a plurality of communication systems, wherein the plurality of communication systems are each configured to control communication channels established with each of a plurality of wireless communication devices utilizing that communication system to participate in a wireless group communication, wherein the resource manager is configured to:
  reserve an amount of resources that are required for each of the plurality of wireless communication devices that are members of a communication group utilizing the at least one communication system to participate in the wireless group communication before the wireless group communication is established among the plurality of wireless communication devices; and
  communicate to one or more other computer devices that control the wireless group communication between the plurality of wireless communication devices that each of the member wireless communication devices utilizing the at least one communication system are allowed to participate in the wireless group communication only if the amount of resources required for all of the member wireless communication devices utilizing the at least one communication system to participate in the wireless group communication have been successfully reserved within the at least one communication system, wherein the wireless group communication is established with the member wireless communication devices utilizing the at least one communication system only if the resource manager confirms that the required amount of resources have been reserved to all member wireless communication devices utilizing the at least one communication system to participate in the wireless group communication.

20. The resource manager of claim 19, wherein the required amount of resources comprises available bandwidth within the at least one communication system.

21. The resource manager of claim 19, wherein the resource manager is further configured to receive, from at least one of the other computer devices, a notification of the member wireless communication devices utilizing the at least one communication system where the resource manager is resident and respond to the notification from the at least one other computer device with either an indication that the required amount of resources were successfully reserved if the required amount of resources were assigned to the wireless group communication within the at least one communication system or with failure if the required amount of resources are not available within the at least one communication system.

22. The resource manager of claim 20, wherein the resource manager is further configured to reserve a predetermined amount of the available bandwidth for all legs of the wireless group communication that terminate within the at least one communication system.

23. A communication system configured to control communication channels established with one or more of a plurality of wireless communication devices that utilize the communication system to participate in a wireless group communication, the communication system further having a resource manager configured to:
  reserve an amount of resources that are required for each of the plurality of wireless communication devices that are members of a communication group utilizing the communication system to participate in the wireless group communication before the wireless group communication is established among the plurality of wireless communication devices; and
  communicate to one or more other computer devices that control the wireless group communication between the plurality of wireless communication devices that each of the member wireless communication devices utilizing the communication system are allowed to participate in the wireless group communication only if the amount of resources required for all of the member wireless communication devices utilizing the communication system to participate in the wireless group communication have been successfully reserved within the communication system, wherein the wireless group communication is established with the member wireless communication devices utilizing the communication system only if the resource manager confirms that the required amount of resources have been reserved to all member wireless communication devices utilizing the communication system to participate in the wireless group communication.

24. The system of claim 23, wherein the required amount of resources comprises available bandwidth within the communication system.

25. The system of claim 23, wherein the communication system is further configured to receive, from at least one of the other computer devices, a notification of the member wireless communication devices utilizing the communication system, and wherein the resource manager is further configured to respond to the notification from the at least one other computer device with either an indication that the required amount of resources were successfully reserved to the if the required amount of resources were assigned to the wireless group communication within the communication system or with failure if the required amount of resources are not available within the communication system.

26. The system of claim 24, wherein the resource manager is further configured to reserve a predetermined amount of the available bandwidth for all legs of the wireless group communication that terminate within the communication system.

27. A system comprising:
  a group communication server configured to set up a wireless group communication for wireless communication devices that are members of a communication group before establishing the wireless group communication among the member wireless communication devices and selectively communicate with a plurality of communication systems configured to control communication channels established with the wireless communication devices utilizing the plurality of communication systems to participate in the wireless group communication; and
  a resource manager resident on at least one communication system of the plurality of communication systems, wherein the resource manager is configured to reserve an amount of resources that are required by each of the member wireless communication devices utilizing the at least one communication system to participate in the wireless group communication, and to communicate to the group communication server that each of the member wireless communication devices utilizing the at least one communication system are allowed to participate in the wireless group communication only if the amount of resources required for all of the member wireless communication devices utilizing the at least one communication system to participate in the wireless group communication have been successfully reserved within the at least one communication system, and wherein the group communication server is further configured to request that the resource manager reserve the amount of resources that the member wireless communication devices utilizing the at least one communication system where the resource manager is resident require to participate in the wireless group communication and establish the wireless group communication with the member wireless communication devices utilizing the at least one communication system only if the resource manager confirms that the required amount of resources have been reserved to all member wireless communication devices utilizing the at least one communication system to participate in the wireless group communication.

28. The system of claim 27, wherein the required amount of resources comprises available bandwidth within the at least one communication system.

29. The system of claim 27, wherein the group communication server is further configured to send a notification to the resource manager of the member wireless communication devices utilizing the at least one communication system where the resource manager is resident and receive, in response to the notification, an indication from the resource manager that the resource manager either successfully reserved or failed to reserve the required amount of resources.

30. The system of claim 27, wherein the at least one communication system of the plurality of communication systems where the resource manager is resident comprises each of the plurality of communication systems.

31. The system of claim 28, wherein the resource manager is further configured to reserve a predetermined amount of the available bandwidth for all legs of the wireless group communication that terminate within the at least one communication system.

32. The system of claim 27, wherein the group communication server is further configured to periodically query the resource manager to verify availability of the required amount of resources for the wireless group communication within the at least one communication system where the resource manager is resident.

33. A computer-readable product, comprising:
a non-transitory computer-readable medium, comprising:
a set of instructions to place a resource manager on at least one computer device within a communication system configured to control communication channels established with each of the wireless communication devices utilizing that communication system to participate in a wireless group communication;
a set of instructions to request, from at least one group communication server that sets up the wireless group communication for each of the wireless communication devices that are members of a communication group before establishing the wireless group communication among the member wireless communication devices, that the resource manager reserve an amount of resources that are required by each of the member wireless communication devices utilizing the communication system to participate in the wireless group communication;
a set of instructions to reserve, at the resource manager, the requested amount of resources required for each of the member wireless communication devices utilizing the communication system to participate in the wireless group communication if the required amount of resources are available;
a set of instructions to communicate, from the resource manager to the at least one group communication server, that each of the member wireless communication devices utilizing the communication system are allowed to participate in the wireless group communication only if the amount of resources required for all of the member wireless communication devices utilizing the communication system to participate in the wireless group communication have been successfully reserved wireless communication devices within the communication system; and
a set of instructions to establish, by the at least one group communication server, the wireless group communication with the member wireless communication devices utilizing the communication system only if the resource manager confirms that the required amount of resources have been reserved to all member wireless communication devices that are utilizing the communication system to participate in the wireless group communication.

34. The computer-readable product of claim 33, further comprising a set of instructions to receive, at the resource manager, a notification of the member wireless communication devices utilizing the communication system where the resource manager is resident and indicate to the at least one group communication server that the resource manager failed to reserve the requested amount of resources to the one or more member wireless communication devices in response to the notification if the required amount of resources are not available within the communication system.

35. The computer-readable product of claim 33, further comprising a set of instructions to reserve, at the resource manager, a predetermined amount of available bandwidth within the communication system for all legs of the wireless group communication that terminate within the communication system where the resource manager is resident.

36. The computer-readable product of claim 33, further comprising a set of instructions for the at least one group communication server to periodically query the resource manager to verify availability of the required amount of resources for the wireless group communication within the communication system where the resource manager is resident.

37. A system for minimizing call setup latency in a group communication among wireless communication devices, comprising:
a plurality of means for controlling communication channels established with a plurality of wireless communication devices utilizing the plurality of means for controlling to participate in a wireless group communication;
at least one means for setting up the wireless group communication for each of the plurality of wireless communication devices that are members of a communication group before the wireless group communication is established; and
a means for reserving an amount of resources that are required by each of the member wireless communication devices utilizing at least one of the plurality of means for controlling to participate in the wireless group communication, the means for reserving the required amount of resources further configured to communicate to the at least one means for setting up the wireless group communication that each of the member wireless communication devices utilizing the at least one means for controlling of the plurality of means for controlling are allowed to participate in the wireless group communication only if the amount of resources required for all of the member wireless communication devices utilizing the at least one means for controlling to participate in the wireless group communication have been successfully reserved within the at least one means for controlling, wherein the at least one means for setting up the wireless group communication is further configured to establish the wireless group communication with the member wireless communication devices utilizing the at least one means for controlling only if the means for reserving confirms that the required amount of resources have been reserved to all member wireless communication devices utilizing the at least one means for controlling to participate in the wireless group communication.

38. The system of claim 37, wherein the means for reserving the amount of resources is further configured to reserve a predetermined amount of available bandwidth within the at least one means for controlling for all legs of the wireless group communication that terminate within the at least one means for controlling.

39. The system of claim 37, wherein the means for reserving the required amount of resources is further configured to receive, from the at least one means for setting up the wireless group communication, a notification of the member wireless communication devices utilizing the at least one means for controlling where the means for reserving is resident and respond to the notification from the at least one means for setting up the wireless group communication with either an indication that the required amount of resources were successfully reserved if the required amount of resources were assigned to the wireless group communication within the at least one means for controlling or with failure if the required amount of resources are not available within the at least one means for controlling.

40. The system of claim 37, wherein the at least one means for setting up the wireless group communication is further configured to periodically query the means for reserving to verify availability of the required amount of resources for the wireless group communication within the at least one means for controlling where the means for selectively reserving is resident.

41. A communication system, comprising:
means for receiving, from at least one group communication server that sets up a wireless group communication for wireless communication devices that are members of a communication group before establishing the wireless group communication among the member wireless communication devices, a request to reserve an amount of resources that are required by each of the member wireless communication devices utilizing the communication system to participate the wireless group communication;
means for reserving the requested amount of resources required for each of the member wireless communication devices utilizing the communication system to participate in the wireless group communication if the required amount of resources are available; and
means for communicating, to the at least one group communication server, that each of the member wireless communication devices utilizing the communication system are allowed to participate in the wireless group communication only if the amount of resources required for that all of the member wireless communication devices utilizing the communication system to participate in the wireless group communication have been successfully reserved within the communication system, wherein the wireless group communication is established with the member wireless communication devices utilizing the communication system only if the required amount of resources are confirmed to have been reserved to all member wireless communication devices that are utilizing the communication system to participate in the wireless group communication.

42. A communication system, comprising:
means for controlling communication channels established with one or more of a plurality of wireless communication devices that utilize the means for controlling to participate in a wireless group communication; and
means for reserving an amount of resources that are required by each of the plurality of wireless communication devices that are members of a communication group utilizing the means for controlling to participate in the wireless group communication and communicating to one or more other computer devices that control the wireless group communications between the plurality of wireless communication devices that each of the member wireless communication devices utilizing the means for controlling are allowed to participate in the wireless group communication only if the amount of resources required for all of the member wireless communication devices utilizing the means for controlling to participate in the wireless group communication have been successfully reserved within the means for controlling, wherein the wireless group communication is established with the member wireless communication devices utilizing the means for controlling only if the means for reserving confirms that the required amount of resources have been reserved to all member wireless communication devices utilizing the means for controlling to participate in the wireless group communication.

43. A system, comprising:
means for setting up a wireless group communication for wireless communication devices that are members of a communication group before establishing the wireless group communication among the member wireless communication devices and selectively communicating with a plurality of communication systems configured to control communication channels established with the wireless communication devices utilizing the plurality of communication systems to participate in the wireless group communication; and
means for selectively reserving an amount of resources that are required by each of the member wireless communication devices utilizing at least one communication system of the plurality of communication systems to participate in the wireless group communication, and to communicate to a group communication server that each of the member wireless communication devices utilizing the at least one communication system are allowed to participate the wireless group communication only if the amount of resources required for each of the member wireless communication devices utilizing the at least one communication system to participate in the wireless group communication have been successfully reserved within the at least one communication system, wherein the means for setting up the wireless group communication is further configured to request, from the means for selectively reserving, a reservation of the amount of resources that each of the member wireless communication devices utilizing the at least one communication system where the means for selectively reserving is resident require to participate in the wireless group communication and establish the wireless group communication with the member wireless communication devices utilizing the at least one communication system only if the means for selectively reserving confirms that the required amount of resources have been reserved to all member wireless communication devices utilizing the at least one communication system to participate in the wireless group communication.

\* \* \* \* \*